April 4, 1939.　　　　F. E. BLOUNT　　　　2,153,293
SIGNALING SYSTEM
Filed April 17, 1937
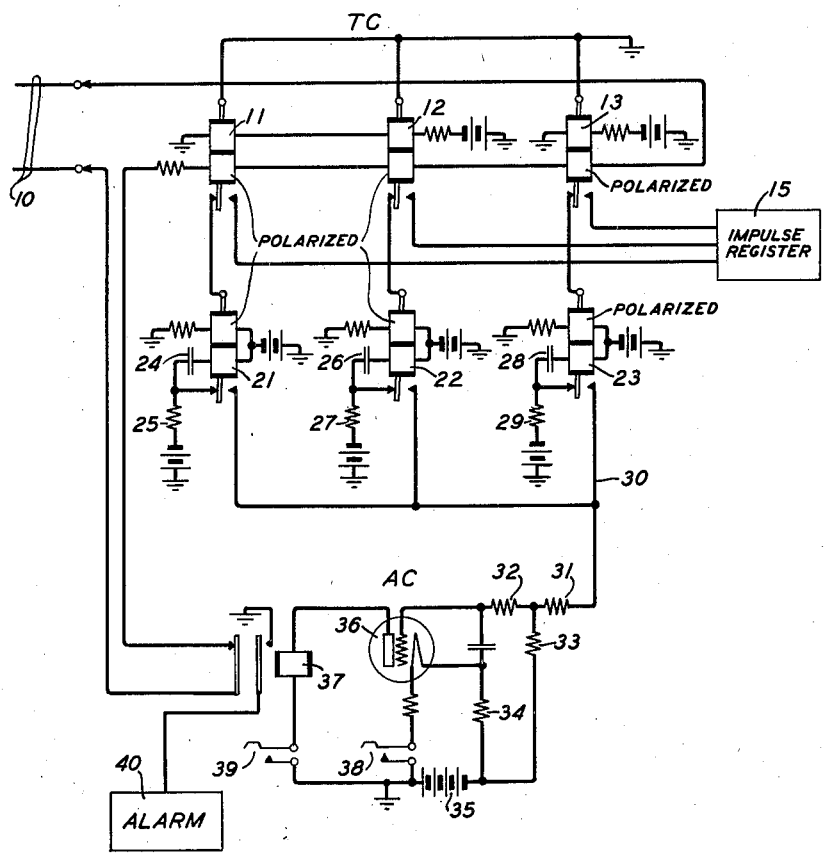
INVENTOR
F. E BLOUNT
BY
M. P. McKenney
ATTORNEY Patented Apr. 4, 1939

2,153,293

UNITED STATES PATENT OFFICE 2,153,293

SIGNALING SYSTEM

Frank E. Blount, Cedar Grove, N. J., assignor to Bell Telephone Laboratories, Incorporated, New York, N. Y., a corporation of New York Application April 17, 1937, Serial No. 137,436

9 Claims. (Cl. 179—175.2)

This invention relates to signaling systems and particularly to systems in which signals are transmitted by impulses of current and it is the object of this invention to insure accurate and reliable signaling.

In systems employing current impulses for the transmission of signals, satisfactory operation of the signal receiving means requires that the impulses be of a certain minimum strength and duration; and, to enable adjustment of the impulse device at the sending end of the signaling circuit, it is necessary that means be provided for measuring the length of time that an impulse is effective to hold an impulse receiving relay operated. One such impulse measuring device, disclosed in Patent 1,976,503 granted to F. Kuchas, October 9, 1934, consists of an impulse receiving relay for responding to the impulse, a set of auxiliary relays controlled by the impulse receiving relays, and a condenser-timed test relay controlled by the auxiliary relays. An improved impulse measuring device which consists of an impulse receiving relay for responding to impulses and a condenser-timed test relay controlled directly by the impulse receiving relay, is disclosed in the application of R. O. Soffel, Serial No. 82,914 filed June 1, 1936.

This invention is an impulse testing circuit comprising an impulse receiving relay and a test relay which measures a period equal to the minimum allowable impulse and an alarm circuit comprising a three-element gas-filled tube and a relay in the plate circuit of the tube for opening the impulse receiving circuit when an impulse shorter than the minimum allowable impulse is received.

The invention will be further described by considering the specific embodiment shown schematically in the drawing which forms a part of this specification. The invention is however, not limited to this particular arrangement and is, in general, applicable to all impulse signaling systems.

The drawing shows schematically a line 10, a testing circuit TC comprising impulse receiving relays 11, 12 and 13, an impulse register 15 and testing relays 21, 22 and 23, and an alarm circuit AC comprising the three-element, hot-cathode gas-filled tube 36, relay 37 and alarm 40.

The impulses received over line 10 are of three kinds. One is a negative impulse of a certain amplitude; another is a positive impulse of the same certain amplitude; and a third is a negative impulse of considerably larger amplitude. Reference may be had to Patent 1,840,132 granted to T. H. Roberts, January 5, 1932 and to the aforementioned Kuchas patent for a complete description of a sender arranged to transmit such current impulses. Each of the impulse receiving relays 11, 12 and 13 is a polarized relay having a biasing winding which is normally effective to hold the armature in the position shown in the drawing. When the test circuit TC is connected to the line 10, the operating windings of relays 11, 12 and 13 receive the current impulses to be tested. Relay 11 is operatively responsive to both the weaker and the stronger negative impulses, relay 12 is operatively responsive only to the positive impulses, and relay 13 is operatively responsive only to the stronger negative impulses incoming over line 10. Each of these impulses must be as long or longer than the minimum interval which is required for operation of the impulse register 15. The impulse register 15 may be of any type suitable for registering the impulses received by relays 11, 12 and 13. One such register is disclosed and described in Patent 1,464,084 granted to A. E. Lundell et al., August 7, 1923.

Each of the testing relays 21, 22 and 23 is a polarized relay having a biasing winding which is normally effective to hold the armature in the position shown in the drawing. The operating winding of relay 21 is connected in series with condenser 24 and resistor 25; the operating winding of relay 22 is connected in series with condenser 26 and resistor 27; and the operating winding of relay 23 is connected in series with condenser 28 and resistor 29. Any current through the operating windings of the test relays results from the charge or discharge of the associated condenser. Normally each of the condensers 24, 26 and 28 is charged, the charging circuit being traced through the normally closed contacts of the associated test and impulse relays. When one of the impulse receiving relays operates, the charging circuit through the associated one of condensers 24, 26 and 28 is opened and the condenser in question discharges through the winding of the test relay and causes its operation. Condenser 24 and resistor 25 are so chosen that the discharge of condenser 24 upon operation of relay 11 is effective to operate and hold relay 21 for an interval equal to the time that relay 11 is operated by a weaker negative impulse of minimum allowable duration. The condenser 26 and resistor 27 are so chosen that the discharge of condenser 26 upon operation of relay 12 is effective to operate and hold relay 22 for an interval equal to the time that relay 12 is operated by a positive impulse of minimum allowable duration. And the condenser 28 and resistor 29 are so chosen that the discharge of condenser 28 upon operation of relay 13 is effective to operate and hold relay 23 for an interval equal to the time that relay 13 is operated by a stronger negative impulse of minimum allowable duration.

If either one of test relays 21, 22 and 23 remains operated after the associated impulse relay has released due to the fact that the received impulse is shorter than necessary for properly actuating the impulse register 15, a circuit is closed from ground through the normally closed contact of the impulse receiving relay and the normally open contact of the associated test relay over conductor 30 and through resistors 31 and 32 to the grid of tube 36 of the alarm circuit AC, and through resistors 31 and 33 to the positive pole of battery 35. Assuming keys 38 and 39 to have been operated, the potential of the grid or control element of tube 36 is changed sufficiently with respect to the filament by the connection of ground to conductor 30 to cause a current through the winding of relay 37 to operate this relay. When relay 37 operates, it closes a circuit for operating the alarm 40 and opens the connection between the operating windings of impulse relays 11, 12 and 13 and the line 10 so that no further impulses will be received and registered in the impulse register 15. The energization of tube 36, once started, continues until the key 39 is operated to its normal position. By opening the contact of key 39, relay 37 is released and the operation of the alarm ceases.

This test arrangement is applicable to a system in which the impulses consist of an interruption of current. In such a case the armature of the test relay will be connected to a front contact of the impulse relay and reoperation of the impulse relay, prior to release of the test relay, will cause operation of the tube 36.

Due to the fact that the tube 36 is almost instantly responsive to the release of any one of the impulse receiving relays while the corresponding one of the test relays is operated, any small deficiency in the length of an incoming impulse will be sufficient to cause the operation of the alarm circuit. The use of a trigger device such as the gas-filled tube 36 in place of a relay is effective to very materially increase the accuracy of the test of the incoming impulses since variations in the operating time of the alarm circuit due to differences in relay structures and relay adjustments are eliminated. Any equivalent trigger device may be substituted for the tube 36 and relay 37.

What is claimed is:

1. In combination, an impulse receiving relay, a test relay operated upon receipt of an impulse by said impulse relay and adapted to remain operated for a predetermined interval of time, a three-element gas-filled tube, circuit means comprising contacts of said relays for initiating the energization of said tube when an impulse received by said impulse relay is shorter than said predetermined interval, and a relay connected in the anode circuit of said tube.

2. In a combination according to claim 1, means for causing the deenergization of said tube.

3. In a combination according to claim 1, a key for opening the anode circuit of said tube.

4. In a signaling system, a line, an impulse relay for operation in response to a signal impulse incoming over said line, an impulse register for registering impulses received by said impulse relay, an auxiliary relay associated with said impulse relay, a circuit closed by the operation of said impulse relay for operating said auxiliary relay and maintaining said auxiliary relay operated for a predetermined interval of time, which interval is equal to the minimum interval during which operation of said impulse relay is effective to cause operation of said impulse register, a three-element gas-filled tube, a relay controlled by said tube, and a circuit for initiating the energization of said tube, said last-mentioned circuit being closed by said impulse and auxiliary relays in the event that the response of said impulse relay to an incoming impulse terminates while said auxiliary relay is operated.

5. In a signaling system, a line, an impulse relay responsive to a signal impulse in said line, an auxiliary relay, a condenser, a resistor, a circuit including the winding of said auxiliary relay, said condenser and said resistor for operating said auxiliary relay and holding said auxiliary relay operated for a predetermined interval of time, said circuit being rendered effective by the response of said impulse relay to a signal impulse, a three-element gas-filled tube, an alarm relay for operation upon energization of said tube, and circuit means effective when the response of the impulse relay to an impulse terminates while said auxiliary relay is operated for initiating the energization of said tube.

6. In a signaling system according to claim 5, circuit means for causing the deenergization of said tube and release of said relay.

7. In a signaling system, a line, impulse relays responsive to signal impulses in said line, each of said relays being responsive to impulses of a different character, an auxiliary relay for each of said impulse relays, each of said auxiliary relays being arranged and connected for operation upon response of its associated impulse relay and for remaining operated for a predetermined interval of time, a three-element gas-filled tube, means effective upon termination of the response of any one of said impulse relays to a signal impulse while its associated auxiliary relay remains operated for initiating the energization of said tube, and an alarm relay controlled by said tube.

8. In combination, an impulse receiving relay, a test relay operated upon receipt of an impulse by said impulse relay and adapted to remain operated for a predetermined interval of time, a thermionic trigger device, circuit means comprising contacts of said relays for actuating said device when an impulse received by said impulse relay is shorter than said predetermined interval, and a relay operated by said trigger device.

9. In combination according to claim 8, an alarm controlled by said relay.

FRANK E. BLOUNT.